United States Patent [19]
Rader

[11] Patent Number: 4,974,622
[45] Date of Patent: Dec. 4, 1990

[54] SELF COMPENSATION FOR DUTY CYCLE CONTROL

[75] Inventor: Richard K. Rader, Farmington Hills, Mich.

[73] Assignee: Borg-Warner Automotive, Inc., Sterling Heights, Mich.

[21] Appl. No.: 468,556

[22] Filed: Jan. 23, 1990

[51] Int. Cl.$^5$ ............................................. F16K 31/06
[52] U.S. Cl. .................................. 137/1; 251/129.05; 251/129.15
[58] Field of Search .............................. 137/1, 624.15; 251/129.05, 129.15

[56] References Cited

U.S. PATENT DOCUMENTS 4,766,921 8/1988 Williams ..................... 251/129.05 X Primary Examiner—Gerald A. Michalsky
Attorney, Agent, or Firm—John C. Evans; Greg Dziegielewski

[57] ABSTRACT

A valve control assembly (10) controls the flow rate of a liquid through a solenoid valve (11) by repeatedly opening the valve (11) for a predetermined time. The control assembly (10) includes a timer (30) for providing a pulsed signal having a pulse width proportional to flow rate to energize and deenergize the operating coil (24) to open and close a valve sealing element (20). A nominal delay time is provided between the start time of the pulse and actual movement of the valve element (12). With each pulsed signal, the actual movement time of the valve element (12) is compared to the nominal delay time providing a deviation time. The deviation time is added to the original pulse width to obtain an adjusted pulse width, which when supplied to the operating coil (24), will effectively maintain the valve element (12) consistently open for the predetermined time.

15 Claims, 2 Drawing Sheets

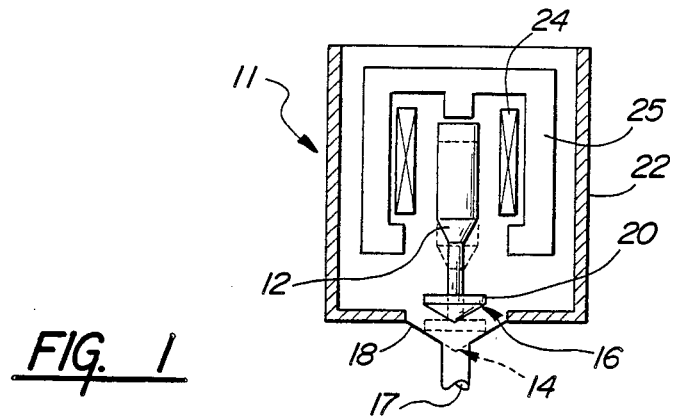
FIG. 1
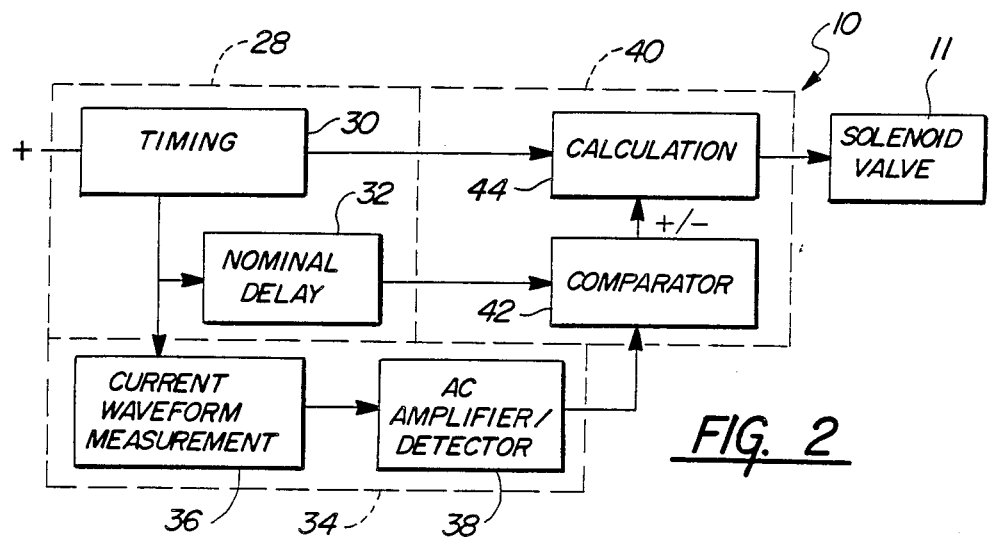
FIG. 2
FIG. 3A
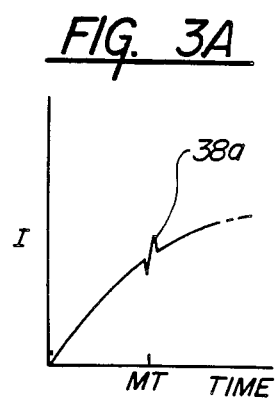
FIG. 3B
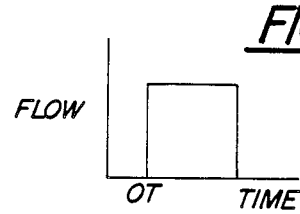
FIG. 3C
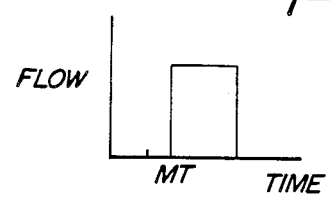

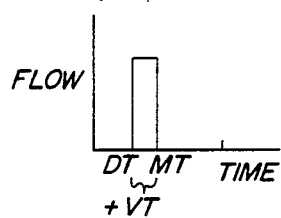
FIG. 3D
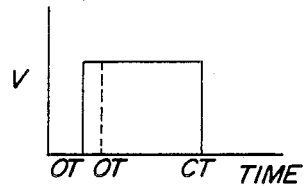
FIG. 3E
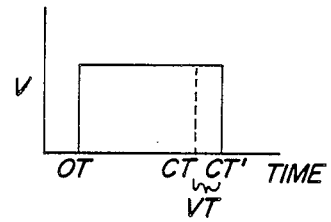
FIG. 3F
FIG. 4
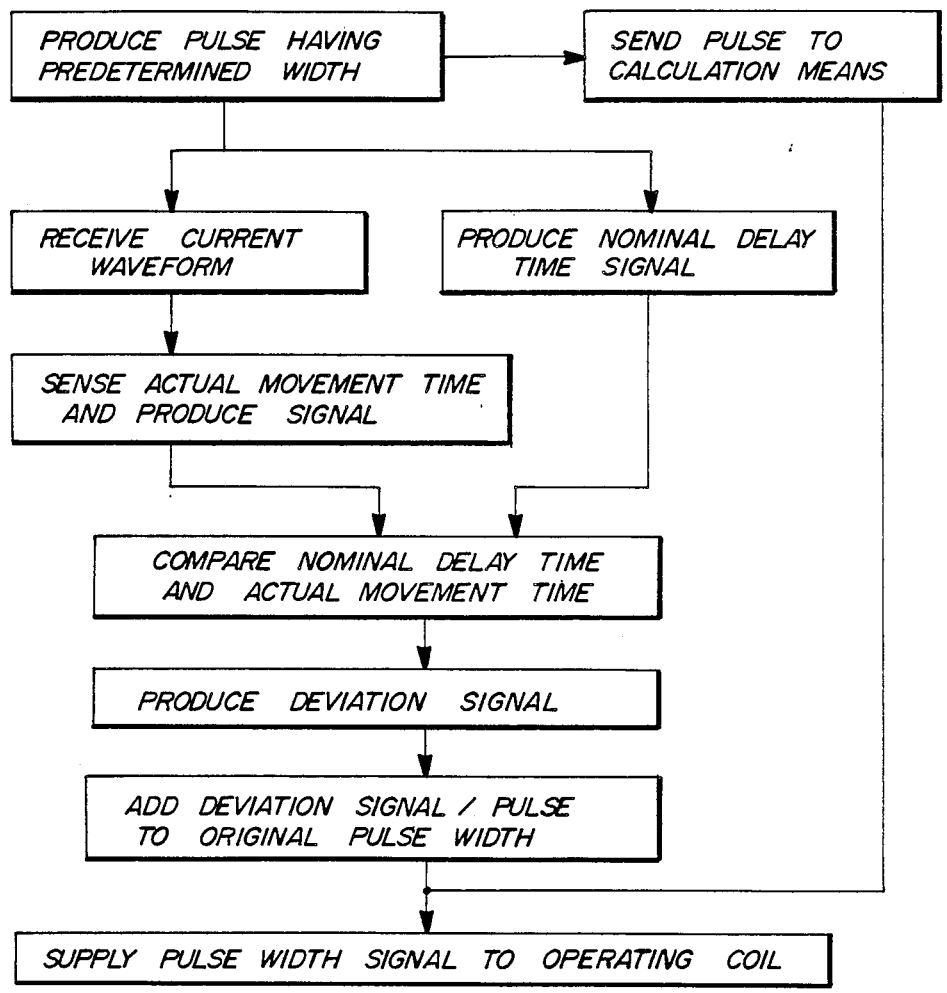

SELF COMPENSATION FOR DUTY CYCLE CONTROL

TECHNICAL FIELD

The invention relates to the electronic control of flow rate through a solenoid valve.

BACKGROUND OF THE INVENTION

Fluid valves are widely used to control the flow of liquid, such as fuel injectors, transmission control valves, etc. One particular type of fluid valve is a solenoid valve which moves a core and valve sealing element against a valve seat to prevent the flow of liquid and moves the core and valve sealing element away from the valve seat to allow liquid to flow therethrough. Solenoid valves include an operating coil which is energized to move the core and valve sealing element away from the valve seat to allow flow therethrough. The actual time of actuation or movement of the core in a solenoid can vary as a function of supply voltage, coil temperature, viscosity of media which in turn relates to coil resistance, voltage source level, and source differential pressure level. In a controlled process where flow rate is important, actual control is difficult since the preset on-time or duty cycle will vary depending upon the above-mentioned factors. Therefore, as the duty cycle changes, the flow rate changes preventing precise control of flowrate.

SUMMARY OF THE INVENTION AND ADVANTAGES

The invention is a valve control assembly for operating a valve apparatus which has a valve element moveable between first and second positions to control flow rate therethrough. The assembly includes actuating means for actuating the valve apparatus between a start time and stop time to move a valve element from a first position to a second position for a predetermined time. Also included is sensing means for sensing actual movement time of the valve element, and adjustment means for adjusting the stop time based on the actual movement time to allow the valve element to remain in the second position for the predetermined time.

The advantages of the invention include that by monitoring the actual movement of the valve element, the predetermined time in which the valve element is maintained in the second position may be held consistent and independent of external variables such as coil resistance, voltage source level, and source differential pressure level, which effect the start time. Therefore, flow rate through the valve assembly may be held to precise rates.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a fragmentary cross sectional view of the valve apparatus;

FIG. 2 is a block diagram of the valve control assembly of the subject invention;

FIGS. 3A-F are timing graphs of the subject invention; and

FIG. 4 is a flow chart of the subject invention.

DESCRIPTION OF THE PREFERRED EMBODIMENT

A valve control assembly for operating a valve apparatus 11 is generally illustrated at 10 in FIGS. 1 and 2. The valve apparatus 11 is generally illustrated in FIG. 1, which includes a valve element 12 moveable between a first 14 and second 16 position to control the flow rate of a liquid therethrough to an output 17. When the valve element 12 is at the first position 14, the valve element 12 is adjacent and in sealing engagement with a valve seat 18 such that no fluid may flow to the output 17.

The valve element 12 includes a sealing element 20 extending therefrom to seal the valve seat 18 closed when the valve element 12 is in the first position 14. The valve apparatus 11 includes a housing 22 supporting the valve element 12 and containing or supplying the fluid which flows about the valve sealing element 20 along the valve seat 18 and to the output 17 when in the second position 16. The housing 22 provides a funneling portion which defines the valve seat 18, and a narrowed portion extending from the valve seat 18 to the output 17. Therefore, the sealing element 20 complements the shape of the funneling portion of the valve seat 18 so that when the valve element 12 is in the first position 14, the valve seat 18 is closed by the sealing element 20 preventing liquid from flowing to the output 17. When the valve element 12 is in the second position 14, the valve seat 18 is open and liquid flows about the sealing element 20 to the output 17.

In the particular embodiment illustrated in FIG. 1, the valve apparatus 11 is a solenoid valve wherein the valve element 12 is generally a cylindrical core element of a magnetic or iron material, as commonly known in the art. The solenoid valve apparatus 11 also includes an operating or inductance coil 24 coiled with respect to an armature 25, as commonly known in the art. The inductance coil is energized to cause movement of the valve element 12 from the first position 14 to the second position 16. When the operating coil 24 is deenergized, the sealing element 20 and the core element 12 are drawn to the closed or first position due to the liquid flow and pressure, or if desired by a biasing spring (not shown). Therefore, the flow rate through the solenoid valve apparatus 11 may be controlled by energizing and deenergizing the operating coil 24.

Due to the fact that the actual time of actuation of the valve element 12 in the solenoid valve apparatus 11 can vary as a function of supply voltage, coil temperature, viscosity of media, and force of fluid, the control of the valve apparatus 11 is difficult or unpredictable since the requested "on-time" or duty cycle may be greater or less depending upon the actual movement time, whether early or late, of the valve element 12. In order to control flow rate, a pulsed signal is provided to the operating coil 24 wherein the pulse widths are proportional to the desired flow rate. The leading edge of each pulse or start time energizes the operating coil 24 in order to move the valve core element 12 from the first position 14 to the second position 16 allowing fluid to flow through the valve seat 18. At the trailing edge of the pulse or stop time, the operating coil 24 is deenergized. The valve element 12 then is drawn against the valve seat 18 by the pressure of the fluid.

In general, when the valve element 12 initially moves due to energization of the operating coil 24, the inductance of the operating coil 24 undergoes a significant change causing the current waveform of the coil 24 to have a first going negative and then positive spike or pulse of brief duration superimposed on the current waveform. The current waveform of the operative coil 24 is illustrated in FIG. 3A. This negative and positive pulse is sensed to determine the actual time of movement MT.

The valve control assembly 10 is generally illustrated in FIG. 2. The valve control assembly 10 includes actuating means 28 for actuating the valve apparatus 11 between the start time OT and the stop time CT to move the valve element 12 from the first position 14 to the second position 16 for a predetermined time. The actuating means 28 includes timing means 30 for receiving a power supply signal and producing a pulsed signal comprised of at least one pulse having a pulse width proportional to flow rate and defined by the start time OT and the stop time CT. In other words, the timing means 30 may be a pulse width modulator which produces pulses having pulse width proportional to the desired flow rate. The pulsed signal has a voltage which goes high or to a positive voltage at the start time, and remains high until the stop time at which the voltage is low or zero. The pulse widths will be greater when a high flow rate is desired, and the pulse widths will be less when a lower flow rate is desired.

The actuating means 28 includes a nominal delay circuit 32 for producing a nominal delay time DT signal indicative of the nominal delay of the movement time of the valve element 12 moving after the start time OT. In other words, when utilizing a solenoid valve apparatus 11, there is generally a delay after the initial energization of the operating coil 24 or the start time before actual movement of the valve element 12. This energization period or nominal delay time DT is generally accounted for in the pulse width as generated by the timing means 30. However, the movement time or delay time DT of the coil movement is not always consistent. The start time OT of the pulse occurs first in time, followed by the movement time MT of the valve element 12, and then the stop time CT of the pulse. The release time of the valve element 12 occurs substantially at the same time as the stop time CT of the pulse and can be consistently compensated. The nominal delay time DT has been compensated for in the pulse width, or start OT and stop CT times, to move the valve element 12 from the first position 14 to the second position 16 for the predetermined time. Therefore, the nominal delay time DT represents the ideal representation of the delay of the movement time after the start time OT which will maintain the valve element 12 open or in the second position 16 for the predetermined time. However, as this delay varies in the actual application, such variation must be compensated.

The valve control assembly 10 includes sensing means 34 for sensing actual movement time MT of the valve element 12. The sensing means 34 includes measurement means 36 for measuring the current waveform of the operating coil 24 producing a measured waveform. The sensing means 34 also includes detector means 38 for detecting an alternating current waveform of a predetermined frequency range in the measured waveform to detect a current spike indicative of the actual movement time MT. The detector means 38 is generally an AC amplifier pulse detector for detecting the negative going portion of the spike 38a shown in FIG. 3A which is indicative of initial movement time MT of the valve element 12.

The valve control assembly 26 also includes adjustment means 40 for adjusting the stop time based on the actual movement time MT to allow the valve element 12 to remain in the second position 16 for the predetermined time. The adjustment means 40 includes comparator means 42 for receiving and comparing the actual movement time MT and the nominal delay time DT for producing a deviation time VT signal. The duration time may be produced in the form of a pulse having width indicative of the deviation VT. The adjustment means 40 also includes calculation means 44 for receiving and adding the deviation time VT or deviation pulse to the stop time CT to produce an adjusted pulse width so that the valve element 12 will remain at the second position 16 for the predetermined time. In other words, the comparator means 42 is a simple comparator as commonly known in the art, which compares the actual movement time MT to the nominal delay time DT with respect to the start time OT. The actual movement time may be less than, equal to, or greater than the nominal delay time DT. If the actual movement time MT is greater than the nominal delay time DT, a positive deviation time VT is sent to the calculation means 44. If the actual movement MT time is less than the nominal delay time DT, a negative deviation time VT is sent to the calculation means 44. If the movement time MT and nominal delay time DT is equal, an equivalent zero deviation time is produced. The calculation means 44 receives the stop time CT and adds the deviation time VT to the stop time CT. If the deviation time VT is positive, the stop time CT will be extended by the amount of time indicated by the deviation time VT. In the deviation time VT is negative, the stop time CT will be decreased to occur at an earlier time.

The calculation means 44 receives the pulsed signal directly to drive the solenoid valve apparatus 11 with the pulsed signal at a predetermined flow rate. The calculation means 44 adjusts the original pulse width with the deviation time in order to maintain open or maintain the valve element 12 to the second position for the predetermined time to produce the desired flow rate. The movement time, nominal delay time and the deviation time are produced and transmitted in the form of electrical signals and are calibrated or coded to indicate the respective times.

FIG. 3A illustrates the current waveform of the operating coil 24 and the occurrence of the current spike versus time. FIG. 3B illustrates the idealized movement time and delay time DT and release time or closing of the valve element 12 by a flow versus time curve at a coil temperature of 25° C. FIG. 3C illustrates the movement or open time MT and close or release time at a coil temperature of 125° C. FIG. 3D illustrates the delay between the two curves of FIGS. 3B and 3C which is the deviation time VT and which is to be compensated for by the valve control assembly 10. FIG. 3E illustrates the start OT and stop CT times for the original pulsed signal produced by the timer means 30, and FIG. 3F illustrates the adjusted pulse width compensating for the delay in FIG. 3D which is transmitted to the operating coil 24 from the calculation means 44.

The invention also includes a method of operating a valve apparatus 11 having a valve element 12 moveable between first 14 and second 16 positions to control rate therethrough as illustrated in FIG. 4. The method includes the steps of moving the valve element 12 from a first position 14 to a second position 16 for a predetermined time defined by the start time and a stop time, sensing actual movement time of the valve element 12, and adjusting the stop time based on the actual movement time to allow the valve element 12 to remain in the second position 16 for the predetermined time. The method is further characterized by producing a pulse signal comprising at least one pulse having a pulse width proportional to flow rate and defined by the start time and the stop time, producing a nominal delay time after the start time indicative of the nominal delay of the movement time after the start time, receiving and comparing the actual movement time and the nominal delay time for producing a deviation time, receiving and adding the deviation time to the stop time to produce an adjusted pulse width so that the valve element 12 will remain at the second position for the predetermined time, measuring the current waveform of an operating coil 24 of the valve apparatus 11 to produce a measured waveform and amplifying an alternating current waveform within a predetermined frequency range of the measured waveform to determine a current spike indicative of the actual movement time.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A valve control assembly (10) for operating a valve apparatus (11) having a valve element (12) movable between first (14) and second (16) positions to control flow rate therethrough, said assembly comprising;

actuating means (28) for actuating the valve apparatus (11) between a start time and stop time to move the valve element (12) from a first position (14) to a second position (16) for a predetermined time, the assembly characterized by including:

sensing means (34) for sensing actual movement time of the valve element (12), adjustment means (40) for adjusting the stop time based on the actual movement time to allow the valve element (12) to remain in the second position (16) for said predetermined time.

2. An assembly as set forth in claim 1 further characterized by said actuating means (28) including timing means (30) for producing a pulsed signal comprised of at least one pulse having a pulse width proportional to flow rate and defined by said start time and said stop time.

3. An assembly as set forth in claim 2 further characterized by said actuating means (28) including delay means (32) for producing a nominal delay time after said start time indicative of the nominal delay of said movement time after said start time.

4. An assembly as set forth in claim 3 further characterized by said adjustment means (40) including comparator means (42) for receiving and comparing said movement time and said nominal delay time for producing a deviation time.

5. An assembly as set forth in claim 4 further characterized by said adjustment means (40) including calculation means (44) for receiving and adding said deviation time to said stop time to produce an adjusted pulse width so that the valve element (12) will remain at the second position (16) for said predetermined time.

6. An assembly as set forth in claim 5 further characterized by including the valve apparatus (11) having the valve element (12), said valve apparatus (11) comprising a solenoid valve having an operating coil (24) and said valve element (12) movable within said operating coil (24) between the first position (14) and the second position (16), said operating coil (24) receiving said pulsed signal for energization thereof during said pulse width to move said core element (12) from said first position (14) to said second position (16).

7. An assembly as set forth in claim 6 further characterized by said sensing means (34) including measurement means (36) for measuring the current waveform of said operating coil (24) producing a measured waveform.

8. An assembly as set forth in claim 7 further characterized by said sensing means (34) including detector means (38) for amplifying an alternating current waveform within a predetermined frequency range of said measured waveform to detect a current spike indicative of said actual movement time.

9. A method of operating a valve assembly having a valve element moveable between first and second positions to control rate therethrough, the method including the steps of; moving the valve element from a first position to a second position for a predetermined time defined by a start time and a stop time, sensing actual movement time of the valve element, and adjusting the stop time based on the actual movement time to allow the valve element to remain in the second position for the predetermined time.

10. A method as set froth in claim 9 further characterized by producing a pulse signal comprised of at least one pulse having a pulse width proportional to flow rate and occurring at said start time until said stop time.

11. An method as set forth in claim 10 further characterized by producing a nominal delay time after the start time indicative of the nominal delay of the movement time after the start time.

12. A method as set forth in claim 11 further characterized by receiving and comparing the movement time and the nominal delay time for producing a deviation time.

13. A method as set forth in claim 12 further characterized by receiving and adding the deviation time to the stop time to produce an adjusted pulse width so that the valve element will remain at the second position for the predetermined time.

14. A method as set forth in claim 13 further characterized by the valve apparatus including an operating coil to be energized to move the valve element to the second position, and the method including measuring the current waveform of an operating coil of the valve assembly to produce a measured waveform.

15. A method as set forth in claim 14 further characterized by amplifying an alternating current waveform within a predetermined frequency range of the measured waveform to determine a current spike indicative of the actual movement time.

* * * * *